(12) United States Patent
Lejin P J (10) Patent No.: US 12,244,594 B2
(45) Date of Patent: Mar. 4, 2025

(54) SECURE CONFIGURATION MANAGEMENT INTERFACES FOR NETWORKING DEVICES

(71) Applicant: Salesforce, Inc., San Francisco, CA (US)

(72) Inventor: Jose Lejin P J, Bangalore (IN)

(73) Assignee: Salesforce, Inc.

( * ) Notice: Subject to any disclaimer, the term of this patent is extended or adjusted under 35 U.S.C. 154(b) by 345 days.

(21) Appl. No.: 17/656,693

(22) Filed: Mar. 28, 2022

(65) Prior Publication Data

US 2023/0308442 A1    Sep. 28, 2023

(51) Int. Cl.
| | | |
|---|---|---|
| *H04L 9/40* | (2022.01) | |
| *G06F 3/04847* | (2022.01) | |
| *H04L 9/32* | (2006.01) | |
| *H04L 41/0813* | (2022.01) | |
| *G06F 3/04842* | (2022.01) | |

(52) U.S. Cl.
CPC .......... *H04L 63/10* (2013.01); *G06F 3/04847* (2013.01); *H04L 9/3234* (2013.01); *H04L 41/0813* (2013.01); *G06F 3/04842* (2013.01)

(58) Field of Classification Search
CPC .............................. H04L 63/10; G06F 3/04847
USPC ............................................................ 726/4
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |

(Continued)

*Primary Examiner* — Anthony D Brown
(74) *Attorney, Agent, or Firm* — Lorenz & Kopf, LLP (57) ABSTRACT

Devices, systems and methods are provided for remotely managing configuration of a networking device. One method of managing configuration of a networking device involves obtaining resources associated with one or more graphical user interface (GUI) displays of a web application for configuring the networking device, receiving a request to access the web application, and in response to the request, determining a representative value for the resources as a function of a current state of the resources, obtaining a reference value for the resources that reflects a validated state of the resources, and instantiating the web application using the resources when the representative value matches the reference value.

20 Claims, 6 Drawing Sheets

(56) References Cited

U.S. PATENT DOCUMENTS

| | | |
|---|---|---|
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Oomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Im et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,062,502 B1 | 6/2006 | Kesler |
| 7,069,231 B1 | 6/2006 | Cinarkaya et al. |
| 7,181,758 B1 | 2/2007 | Chan |
| 7,289,976 B2 | 10/2007 | Kihneman et al. |
| 7,340,411 B2 | 3/2008 | Cook |
| 7,356,482 B2 | 4/2008 | Frankland et al. |
| 7,401,094 B1 | 7/2008 | Kesler |
| 7,412,455 B2 | 8/2008 | Dillon |
| 7,508,789 B2 | 3/2009 | Chan |
| 7,620,655 B2 | 11/2009 | Larsson et al. |
| 7,698,160 B2 | 4/2010 | Beaven et al. |
| 7,730,478 B2 | 6/2010 | Weissman |
| 7,779,475 B2 | 8/2010 | Jakobson et al. |
| 8,014,943 B2 | 9/2011 | Jakobson |
| 8,015,495 B2 | 9/2011 | Achacoso et al. |
| 8,032,297 B2 | 10/2011 | Jakobson |
| 8,082,301 B2 | 12/2011 | Ahlgren et al. |
| 8,095,413 B1 | 1/2012 | Beaven |
| 8,095,594 B2 | 1/2012 | Beaven et al. |
| 8,209,308 B2 | 6/2012 | Rueben et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0021019 A1 | 1/2006 | Hinton et al. |
| 2008/0249972 A1 | 10/2008 | Dillon |
| 2009/0063414 A1 | 3/2009 | White et al. |
| 2009/0100342 A1 | 4/2009 | Jakobson |
| 2009/0177744 A1 | 7/2009 | Marlow et al. |
| 2011/0247051 A1 | 10/2011 | Bulumulla et al. |
| 2012/0042218 A1 | 2/2012 | Cinarkaya et al. |
| 2012/0218958 A1 | 8/2012 | Rangaiah |
| 2012/0233137 A1 | 9/2012 | Jakobson et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2018/0046686 A1* | 2/2018 | Kobayashi ............ G06F 3/0605 |
| 2021/0144517 A1* | 5/2021 | Guim Bernat ...... H04L 41/0869 |

* cited by examiner

SECURE CONFIGURATION MANAGEMENT INTERFACES FOR NETWORKING DEVICES

TECHNICAL FIELD

One or more implementations relate to the field of computer networks, and more specifically, to managing configuration of networking devices.

BACKGROUND

Telecommunications networks, such as the Internet, are frequently used for communicating between devices and end users. For example, modern software development has evolved towards web applications and cloud-based applications that provide access to data and services via the Internet or other networks. Modern cloud computing systems may include hundreds or thousands of servers, databases, and/or other infrastructure components that are connected to the Internet via one or more networking devices, such as routers, modems, access points, switches, gateways, firewalls and the like. Many networking devices host a web server that supports a web application user interface that allows a user to configure the settings or parameters of the networking device. However, vulnerabilities in the web application risk unauthorized or uncontrolled modifications to the configuration of a networking device, which, in turn, could interfere with communications and lead to adverse business impacts, financial losses or other damage. Accordingly, it is desirable to secure networking devices from unauthorized reconfiguration.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

The following description describes implementations for managing the configuration of a networking device by verifying the current state of resources associated with a configuration web application match or otherwise correspond to a validated state for the resources before instantiating the configuration web application to allow a user to modify the configuration. For example, in some implementations, the configuration web application relies on JavaScript files, cascading style sheet (CSS) files or other static graphical user interface (GUI) files that are stored or otherwise maintained at the networking device with limited security or integrity protection and lack of change control mechanisms, which could allow an attacker to modify these files to alter program logic and create vulnerabilities. In such scenarios, a user utilizing a compromised version of the configuration web application can result in potentially damaging misconfigurations.

For example, an attacker could modify the GUI files associated with a configuration web application in a way that effectively alters program logic of the configuration web application in a malicious way that is not apparent to an end user, such that the end user will exercise their normal application configuration and monitoring workflows using configuration web application GUI(s) without knowledge of the underlying logic changes. This, in turn, can trigger a wrong or malicious operations at the networking device in the backend, potentially causing significant business impacts. For example, due to compromised or modified files associated with the configuration web application, a user attempting to configure a traffic management firewall with some rules could unknowingly trigger one or more application programming interfaces (APIs) to clear the configured firewall rules. As another example, an attacker could modify files associated with the configuration web application in such a way that the networking device is configured with insecure settings. In yet another example, compromised files associated with the configuration web application could be modified to display incorrect or inaccurate data or information to a user, thereby causing the user to make undesirable decisions based on incorrect or malicious information.

As described in greater detail below, to manage configuration of a networking device, a configuration management service (or configuration manager) obtains the local resources (e.g., JavaScript files, CSS files, and/or the like) stored at the networking device that are associated with the GUI display(s) of the web application for configuring the networking device, and in response to a user request to access the web application, the configuration management service calculates or otherwise determines a representative value for the resources as a function of a current state of the resources substantially in real-time. For example, in one or more implementations, the configuration management service utilizes a cryptographic hash function compliant with the Secure Hash Algorithm (SHA) standards (e.g., SHA-2, SHA-3, etc.) to calculate or otherwise determine the representative value indicative of the current state of the resources (e.g., by passing the local resources as an input to the cryptographic hash function). The configuration management service also obtains a reference value for the local resources that corresponds to a representative value for the local resources as a function of a verified or validated state of the local resources. For example, the same cryptographic hash function may be utilized to calculate the reference value by inputting or otherwise providing the initial, valid state of the local resources to the cryptographic hash function upon creation or instantiation of the local resources to the networking device, or upon initial deployment of the local resources to the networking device. In this manner, the representative value represents a known, trusted and valid state of the local resources. As a result, any modifications to any one of the local resources will result in the representative value for the current state of the local resources deviating or differing from the reference value, thereby indicating a modified, and thereby, a potentially compromised or untrustworthy state of the local resources.

When the configuration management service determines that the current state of the local resources for the configuration web application matches or otherwise corresponds to a trusted, valid state of the local resources (e.g., by virtue of the representative value and reference value matching), the configuration management service enables or otherwise allows the web server processes at the networking device to respond to the user request by instantiating or otherwise executing the configuration web application using the current state of the local resources, thereby allowing the user to modify the networking device (e.g., by changing the values or other configuration data for one or more parameters, settings, etc.). On the other hand, when the determines that the local resources for the configuration web application have been modified from the trusted, valid state of the local resources (e.g., by virtue of a mismatch between the representative value and reference value), the configuration management service disables or otherwise prevents the instantiation or otherwise execution of the configuration web application using the modified local resources and provides a corresponding user notification to the user, thereby apprising the user of the potential vulnerability. In this manner, the configuration management service secures configuration of the networking device by preventing unauthorized modification of the local resources associated with the configuration web application from having any impact or effect.

Figure 1:
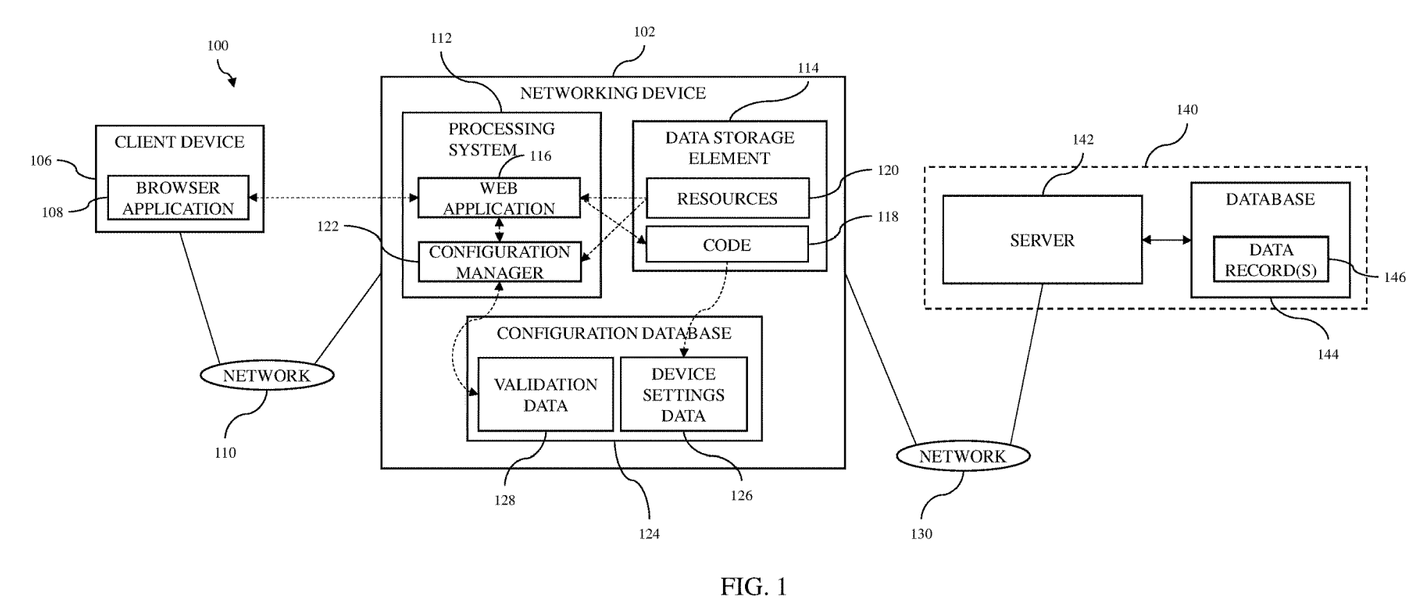
FIG. 1 is a block diagram illustrating a system including a networking device according to some example implementations.

FIG. 1 depicts an exemplary system 100 that includes a networking device 102 that manages communications between communications networks 110, 130, such as the Internet or any sort or combination of wired and/or wireless computer network, cellular network, mobile broadband network, radio network, or the like. In this regard, the networking device 102 may be realized as any sort of router, gateway, switch, access point, firewall, proxy server or other network management device that is configurable to support implementations of the subject matter described herein. It should be appreciated that FIG. 1 depicts a simplified representation of the system 100 for purposes of explanation and is not intended to be limiting.

The networking device 102 generally represents the combination of hardware, circuitry, processing logic and/or other components configured to regulate, mediate or otherwise manage communications to/from networks 110, 130 and support the processes, tasks, operations, and/or functions described herein. In this regard, the networking device 102 generally includes a processing system 112, which may be implemented using any suitable processing system and/or device, such as, for example, one or more processors, central processing units (CPUs), controllers, microprocessors, microcontrollers, processing cores, application-specific integrated circuits (ASICs) and/or other hardware computing resources configured to support the operation of the processing system described herein. Additionally, although not illustrated in FIG. 1, in practice, the networking device 102 generally includes one or more communications interfaces, which include any number of transmitters, receiver, transceivers, wired network interface controllers (e.g., an Ethernet adapter), wireless adapters or another suitable network interface that supports communications to/from the networks 110, 130 coupled thereto.

The processing system 112 may include or otherwise access a data storage element 114 (or memory) capable of storing programming instructions for execution by the processing system, that, when read and executed, are configurable cause processing system to create, generate, or otherwise facilitate an instance of a configuration web application 116 at run-time (or "on-demand") based at least in part upon code 118 and other data or resources 120 that are stored or otherwise maintained by the memory 114 at the networking device 102. Depending on the implementation, the memory 114 may be realized as a random access memory (RAM), read only memory (ROM), flash memory, magnetic or optical mass storage, or any other suitable non-transitory short or long term data storage or other computer-readable media, and/or any suitable combination thereof. In exemplary implementations, the memory 114 stores programming instructions that, when executed by the processing system 112, are configurable to cause the processing system 112 to create, generate, or otherwise facilitate a configuration management service 122 (or configuration manager) in connection with the web application 116 that is configurable to support the subject matter described herein. In this regard, although FIG. 1 depicts the configuration web application 116 and the configuration manager 122 as separate or distinct components, in practice, the configuration manager 122 may be integrated, incorporated, or otherwise combined with the configuration web application 116 (e.g., as a plug-in or add-in to existing software for the web server that provides the configuration web application 116).

In exemplary implementations, the code 118 and resources 120 associated with the configuration web application 116 are cooperatively configured to provide one or more graphical user interface (GUI) displays at a client device 106 that allow a human user of the client device 106 to remotely configure the networking device 102. In this regard, the client device 106 generally represents an electronic device coupled to the network 110 that may be utilized by a user to access an instance of the networking device configuration web application 116 using an application 108 executing on or at the client device 106. In practice, the client device 106 can be realized as any sort of personal computer, mobile telephone, tablet or other network-enabled electronic device. In exemplary implementations, the client device 106 includes a display device, such as a monitor, screen, or another conventional electronic display, capable of graphically presenting data and/or information along with a user input device, such as a touchscreen, a touch panel, a mouse, a joystick, a directional pad, a motion sensor, or the like, capable of receiving input from the user of the client device 106. The illustrated client device 106 executes or otherwise supports a client application 108 that communicates with the web server functionality provided by the processing system 112 at the networking device 102 using a networking protocol. In some implementations, the client application 108 is realized as a web browser or similar local client application executed by the client device 106 that contacts the networking device 102 using a networking protocol, such as the hypertext transport protocol (HTTP). In this regard, in one or more implementations, the client application 108 may be utilized to access or otherwise initiate an instance of the configuration web application 116 hosted by the networking device 102, where the configuration web application 116 provides one or more web page GUI displays within the client application 108 that include GUI elements for modifying or configuring one or more settings, parameters or other configurations associated with the networking device 102.

In the illustrated implementation, the networking device 102 includes a data storage element 124 (alternatively referred to herein without limitation as a configuration database) that stores or otherwise maintains device settings data 126 pertaining to the current configuration of the functionality of the networking device 102 that dictates the manner in which the networking device 102 mediates communications or data transmissions between networks 110, 130. In this regard, the device settings data 126 may include user-defined values and/or default values for one or more configurable parameters, variables or settings referenced by or otherwise utilized by the underlying network management software and/or firmware associated with the network management functionality of the networking device 102, such as, for example, access control lists (ACLs), data throughput parameters, and/or the like. In some implementations, the device settings data 126 may also include user-defined or user-configured rules for managing communications or data transmissions via the networking device 102, such as, for example, network settings, firewall configuration settings, system settings, etc.

In one or more implementations, the device settings data 126 are configured to influence the manner in which the networking device 102 mediates communications or data transmissions between the network 110 (e.g., by other instances of client devices 106) and a computing system 140 that resides behind the networking device 102. The computing system 140 includes one or more servers 142 that users may interact with, over the networks 110, 130 to obtain data or other information from one or more data records 146 at a database 144 or other repository associated with the computing system 140. In one or more implementations, the networking device 102 is realized as a load balancer that manages the distribution of network traffic across different servers 142 of the computing system 140. In this regard, the server 142 generally represents a server computing device, server computing system or another combination of processing logic, circuitry, hardware, and/or other components configured to support remote access to data records 146 maintained in the database 144 via the networks 110, 130. For example, the database 144 may maintain, on behalf of a user, tenant or other resource owner, data records entered or created by that resource owner (or users associated therewith), files, objects or other records uploaded by the resource owner (or users associated therewith), and/or files, objects or other records generated by one or more computing processes (e.g., by the server 142 based on user input or other records or files stored in the database 144). In this regard, in one or more implementations, the computing system 140 is realized as an on-demand multi-tenant database system that is capable of dynamically creating and supporting virtual applications based upon data from a common resource database 144 that is shared between multiple tenants, which may alternatively be referred to herein as a multi-tenant database. Data and services generated by the virtual applications may be provided via the networks 110, 130 to any number of client devices, as desired, where instances of the virtual application may be suitably generated at run-time (or on-demand) using a common application platform that securely provides access to the data in the database 144 for each of the various tenants subscribing to the multi-tenant system.

Still referring to FIG. 1, the configuration database 124 also includes validation data 128 that may be referenced by or otherwise utilized by the configuration manager 122 to verify that the current state of the resources 120 associated with the configuration web application 116 is valid and trustworthy prior to the configuration web application 116 generating one or more GUI displays using the resources 120. In one or more exemplary implementations, the validation data 128 includes one or more hash values that represent the output of a cryptographic hash function when the resources 120 associated with the configuration web application 116 are input to the cryptographic hash function in a known, trusted and valid state. For example, upon initial deployment of the resources 120 to or at the networking device 102, the configuration manager 122 or a hashing system at the networking device 102 may calculate or otherwise determine one or more validated reference hash values for the resources 120 as a function of the resources 120 in their valid and unmodified initial state. In this regard, the set of JavaScript files, CSS files or other GUI files that make up the local resources 120 associated with the configuration web application 116 may be input or otherwise provided to an SHA-2 or SHA-3 cryptographic hash function to obtain a corresponding hash value that represents the set of JavaScript files, CSS files or other GUI files in an unmodified and uncompromised valid state.

As described in greater detail below, prior to the configuration web application 116 invoking or otherwise utilizing the local resources 120, the configuration web application 116 invokes or otherwise initiates the configuration manager 122 to verify or otherwise validate the current state of the local resources 120 using the validation data 128. In response to receiving a request from a user of the client device 106 to view or otherwise access one or more web page GUI displays associated with the configuration web application 116, the configuration manager 122 retrieves or otherwise obtains the local resources 120 associated with the one or more web page GUI displays of the configuration web application 116 and then calculates or otherwise determines a current representative value for the local resources 120 that reflects the current state of the local resources 120 in a similar manner as described above in the context of the validated reference hash values for the resources 120. For example, the configuration manager 122 or another hashing system at the networking device 102 may calculate or otherwise determine one or more current representative hash values for the resources 120 as a function of the resources 120 in their current, real-time state, for example, by inputting the same set of JavaScript files, CSS files or other GUI files that make up the local resources 120 associated with the configuration web application 116 in their current state to the same SHA-2 or SHA-3 cryptographic hash function.

When the current representative hash value(s) reflecting the current state of the local resources 120 match the validated reference hash value(s) determined based on a validated state of the local resources 120, the configuration manager 122 determines that the current state of the local resources 120 are secure and trustworthy and initiates the configuration web application 116 rendering or otherwise generating one or more web page GUI displays using the local resources 120. Thereafter, the user of the client device 106 may manipulate the GUI element(s) of the web page GUI display(s) associated with the configuration web application 116 to modify or otherwise input values for one or more configurable parameters, variables, rules or other settings that are provided to one or more APIs or other code 118 associated with the configuration web application 116 to correspondingly modify or update the device settings data 126 at the networking device 102. In this manner, by validating the current state of the underlying resources 120 associated with the GUI element(s) of the web page GUI display(s), the configuration manager 122 secures the logical relationship between the local resources 120 and the code 118 associated with modifying the device settings data 126, thereby ensuring the user's desired configuration of the networking device 102 is effectuated at the networking device 102 without risks of the user unknowingly creating an undesirable configuration or enabling an unauthorized configuration of the networking device 102.

Alternatively, when the current representative hash value(s) reflecting the current state of the local resources 120 do not match the validated reference hash value(s), the configuration manager 122 determines that the current state of the local resources 120 are potentially untrustworthy, unsecure or compromised based on the mismatch and provides a corresponding indication to the configuration web application 116 to prevent rendering or otherwise generating one or more web page GUI displays using invalid local resources 120. In this regard, in lieu of a configuration web page GUI display associated with the configuration web application 116, the configuration web application 116 and/or the configuration manager 122 may render, generate or otherwise provide a GUI display that provides a user notification that the local resources 120 are potentially compromised or untrustworthy. In this manner, the configuration manager 122 prevents user from unknowingly creating an undesirable configuration or enabling an unauthorized configuration of the networking device 102 by accessing an instance of the configuration web application 116 that would otherwise utilize the local resources 120 in an unauthorized and unvalidated modified state.

Figure 2:
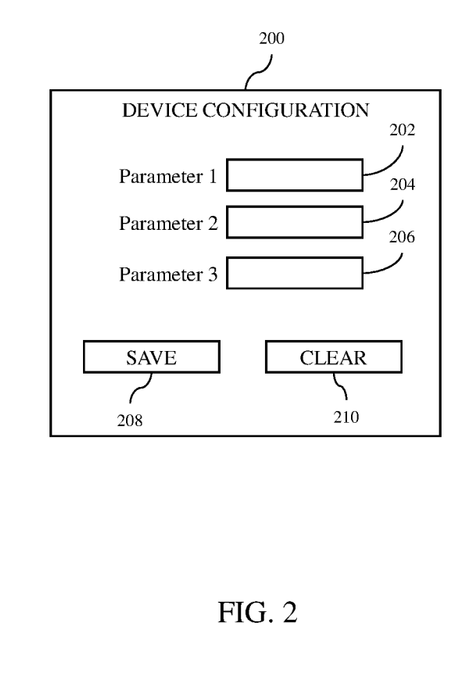
FIGS. 2-3 depict exemplary configuration web page graphical user interface (GUI) displays suitable for presentation by a configuration web application hosted at a networking device such as the networking device in the system of FIG. 1 according to some example implementations.
Figure 3:
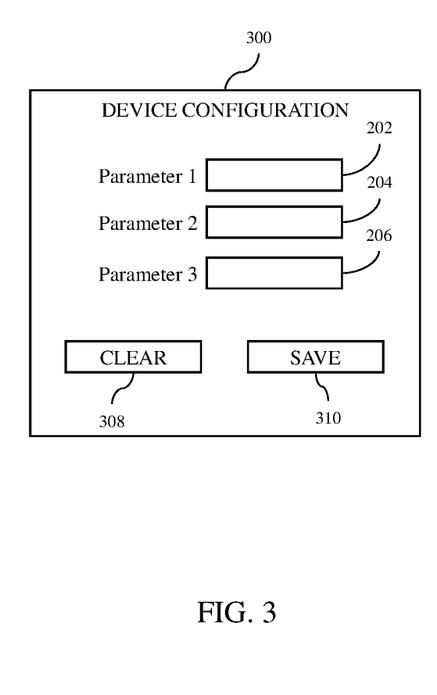

FIGS. 2-3 depict exemplary configuration web page GUI display(s) that could be generated or otherwise provided by the configuration web application 116 based on different states of the underlying local resources 120. In this regard, FIG. 2 depicts a valid configuration web page GUI display 200 that would be generated based on the local resources 120 in a validated state, while FIG. 3 depicts a compromised configuration web page GUI display 300 that could be generated based on the local resources 120 in a modified state. As shown in FIG. 2, the valid configuration web page GUI display 200 includes GUI elements 202, 204, 206 that allow the user to manually input values or otherwise modify values for one or more parameters of the device settings data 126 utilized by network management functionality of the networking device 102 along with a selectable GUI element 208 that invokes or otherwise initiates one or more APIs included in the code 118 associated with the configuration web application 116 to update the device settings data 126 to reflect the user-configured values indicated by the GUI elements 202, 204, 206 (e.g., to save the user-configured values). Another selectable GUI element 210 that invokes or otherwise initiates one or more other APIs included in the code 118 associated with the configuration web application 116 to clear or otherwise reset the device settings data 126 by removing any previous user-configured values (e.g., to clear the current configuration).

As shown in FIG. 3, in the compromised configuration web page GUI display 300, the local resources 120 utilized to generate the configuration web page GUI display 200 have been modified to change the text or labels associated with the GUI elements 208, 210 associated with corresponding APIs of the code 118 associated with the configuration web application 116, thereby changing the logical relationship between the GUI elements 202, 204, 206 and the modified GUI elements 308, 310 perceived by the user. For example, in response to user selection of the modified SAVE button 310, instead of the invoking an API to update the device settings data 126 to reflect the user-configured values indicated by the GUI elements 202, 204, 206, the configuration web application 116 would invoke or otherwise initiate one or more other APIs to clear or otherwise reset the device settings data 126. In this regard, a user utilizing the compromised configuration web page GUI display 300 may unknowingly clear the user-configured parameters of the device settings data 126 of the networking device 102 rather than saving, committing or otherwise implementing the user input values indicated by the GUI elements 202, 204, 206 in the device settings data 126. Similarly, in response to user selection of the modified CLEAR button 308, instead of the invoking an API to clear the device settings data 126, the configuration web application 116 would invoke or otherwise initiate one or more other APIs to update the device settings data 126 to reflect the user-configured values indicated by the GUI elements 202, 204, 206 contrary to the user's intent. As another example, the text for a button or similar GUI element to perform a system reset could be changed to indicate the button instead will perform a system reboot, which could lead to a user inadvertently resetting the configuration to an initial or default state for the device settings data when he or she believes they are merely rebooting the networking device.

As described above, in an exemplary implementation, the validated reference hash value for the local resources 120 is calculated or otherwise determined based on the valid state of the local resources 120 that results in the valid configuration web page GUI display 200. In this regard, when the representative hash value determined based on the current, real-time state of the local resources 120 matches the validated reference hash value, the configuration manager 122 enables the configuration web application 116 to generate the valid configuration web page GUI display 200 within the browser application 108 at the client device 106 based on the current state of the local resources 120 at the networking device 102. On the other hand, when the modified local resources 120 associated with the compromised configuration web page GUI display 300 are input to the cryptographic hash function, the resulting representative hash value will be different from the validated reference hash value corresponding to the valid configuration web page GUI display 200. In response to the mismatch, the configuration manager 122 disables use of the modified local resources 120 by the configuration web application 116, thereby preventing the compromised configuration web page GUI display 300 from being generated at the client device 106. By preventing access to the compromised configuration web page GUI display 300, any malicious or unauthorized modifications to the local resources 120 are rendered ineffective, thereby securing the device settings data 126 from unauthorized or inadvertent modification that could result from unknowing usage of the compromised configuration web page GUI display 300.

Figure 4:
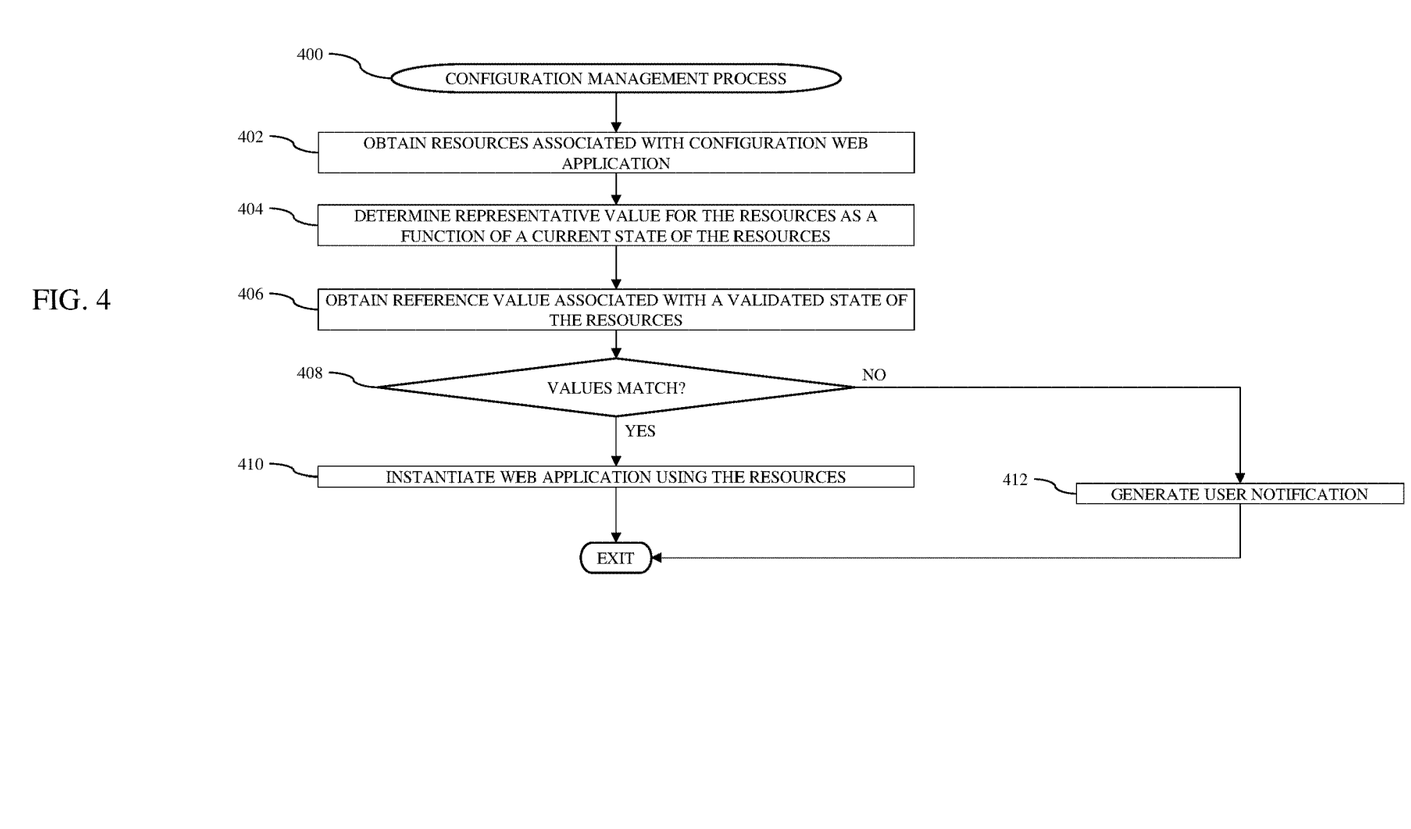
FIG. 4 is a flow diagram illustrating a configuration management process suitable for use with the networking device in the system of FIG. 1 in connection with the configuration web page GUI displays of FIGS. 2-3 according to some example implementations.

FIG. 4 depicts an exemplary configuration management process 400 that may be implemented or otherwise performed by a configuration management service to securely enable remote configuration of a networking device by protecting against unauthorized modifications to web application resources and perform additional tasks, functions, and/or operations described herein. For illustrative purposes, the following description may refer to elements mentioned above in connection with FIG. 1. In this regard, while portions of the configuration management process 400 may be performed by different elements of the system 100, for purposes of explanation, the subject matter is described herein in the context of the configuration management process 400 being primarily performed by the configuration management service 122 at the networking device 102. It should be appreciated that the configuration management process 400 may include any number of additional or alternative tasks, the tasks need not be performed in the illustrated order and/or the tasks may be performed concurrently, and/or the configuration management process 400 may be incorporated into a more comprehensive procedure or process having additional functionality not described in detail herein. Moreover, one or more of the tasks shown and described in the context of FIG. 4 could be omitted from a practical implementation of the configuration management process 400 as long as the intended overall functionality remains intact.

In exemplary implementations, the configuration management process 400 is triggered or otherwise initiated in response to a user request to access a configuration web application associated with a networking device, for example, by the user inputting a uniform resource locator (URL) or other network address associated with the configuration web application at the networking device into a web browser application at a client device. Referring to FIG. 4 with continued reference to FIG. 1, the configuration management process 400 initializes or otherwise begins by retrieving or otherwise obtaining local resources at the networking device that are associated with the configuration web application and calculating or otherwise determining a representative value for the local resources as a function of the current state of the local resources (tasks 402, 404). For example, as described above, the configuration manager 122 may retrieve or otherwise obtain the current set of the JavaScript files, CSS files and/or other GUI files maintained as local resources 120 at the networking device 102 and then input the current set of JavaScript files, CSS files and/or other GUI files in their current state into a cryptographic hash function to obtain a hash value that represents the current state of the local resources 120.

After determining a representative value for the current state of the local resources, the configuration management process 400 continues by retrieving or otherwise obtaining a reference value associated with a previously validated state of the local resources at the networking device and then compares the reference value to the representative value for the current state of the local resources to confirm the values match (tasks 406, 408). As described above, the configuration manager 122 may retrieve or otherwise obtain, from the configuration database 124 (e.g., validation data 128) the validated reference hash value determined by the same cryptographic hash function when previously inputting the same set of the JavaScript files, CSS files and/or other GUI files in their initial, trusted and unmodified valid state, and then compare the validated reference hash value to the current representative hash value that reflects the current state of the local resources 120.

When the current representative hash value that reflects the current state of the local resources matches the validated reference value associated with a valid state of the local resources, the configuration management process 400 instantiates or otherwise enables execution of the configuration web application using the current state of the local resources (task 410). In this regard, when the configuration manager 122 validates the current state of the local resources 120 based on the representative hash value, the configuration manager 122 provides a corresponding indication to the configuration web application 116 that results in the configuration web application 116 responding to the user request by generating or otherwise providing a configuration web page GUI display corresponding to the URL or network address input by the user using the current state of the local resources 120. Thereafter, the user may interact with the configuration web page GUI display (e.g., configuration web page GUI display 200) to manually configure values for the device settings data 126 and initiate one or more APIs or other code 118 associated with the configuration web application 116 to update or otherwise modify the device settings data 126 at the networking device 102 in a corresponding manner.

When there is a mismatch between the current representative hash value and the validated reference value, the configuration management process 400 determines that the current state of the local resources may be compromised and generates or otherwise provides a corresponding user notification (task 412). In this regard, when the configuration manager 122 determines the current state of the local resources 120 is potentially invalid, corrupted or otherwise compromised, the configuration manager 122 provides a corresponding indication to the configuration web application 116 that results in the configuration web application 116 responding to the user request by generating or otherwise providing user notification within the browser application 108 at the client device 106 that indicates the configuration web application 116 is unavailable or potentially compromised, rather than providing a compromised configuration web page GUI display (e.g., compromised configuration web page GUI display 300). In this manner, the configuration management process 400 secures the device settings data 126 from undesired, unintended or unauthorized modification or reconfiguration that could result from compromised local resources 120.

Figure 5:
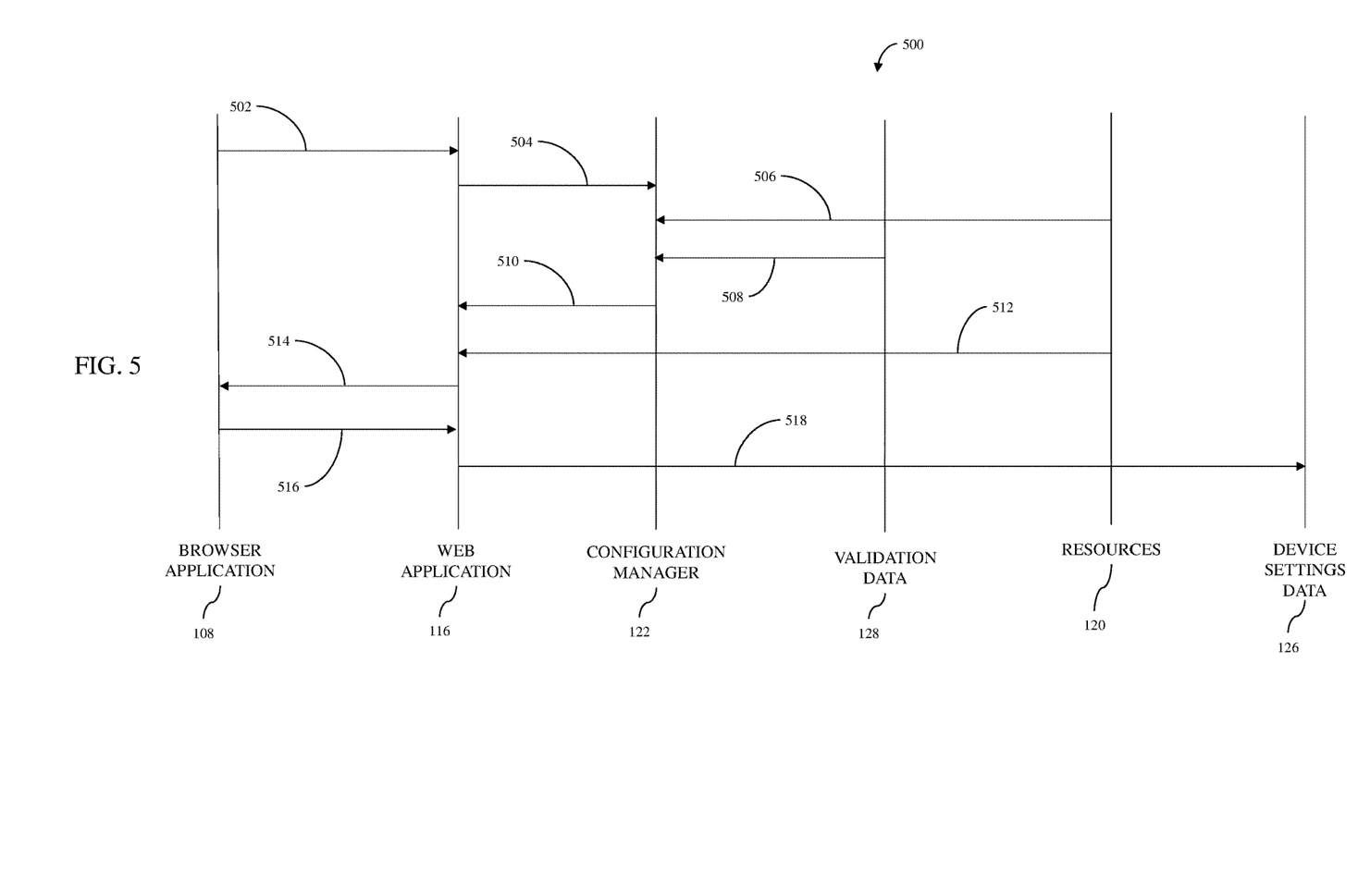
FIG. 5 depicts an exemplary timing diagram corresponding to the configuration management process of FIG. 4 according to some example implementations.

FIG. 5 depicts a timing diagram 500 illustrating an exemplary implementation of the configuration management process 400 of FIG. 4 in the context of the system 100 of FIG. 1. The configuration management process 400 is triggered in response to receiving, at the networking device 102, a request 502 from a browser application 108 to access the configuration web application 116 associated with the networking device 102, for example, by a user of the client device 106 navigating the browser application 108 to a URL or other network address associated with the configuration web application 116 over the network 110. Prior to initiation, the configuration web application 116 triggers or otherwise invokes the configuration management service 122 by providing a corresponding request 504 to the configuration management service 122 to validate the current state of the local resources 120 before executing the configuration web application 116 using the local resources 120. In response, the configuration manager 122 retrieves or otherwise obtains 506 the local resources 120 utilized for generating the GUI displays of the configuration web application 116 from the data storage element 114 of the networking device 102 (e.g., task 402) and then calculates or otherwise determines a representative hash value of the current state of the local resources 120 in real-time (e.g., task 404). Thereafter, the configuration manager 122 retrieves or otherwise obtains 508 the reference hash value for the validated state of the local resources 120 from the validation data 128 maintained in the configuration database 124 (e.g., task 406).

FIG. 5 depicts a scenario where the validated reference hash value for the local resources 120 matches the current representative hash value for the local resources 120 (e.g., at task 408). When the configuration manager 122 verifies the current representative hash value and the validated reference hash value match, the configuration manager 122 provides a corresponding indication 510 to the configuration web application 116 to initiate the execution of the configuration web application 116 using the local resources 120 (e.g., task 410). Thereafter, the configuration web application 116 retrieves or otherwise obtains 512 the current state of the local resources 120 from the data storage element 114 and generates or otherwise provides 514 a corresponding configuration web page GUI display (e.g., configuration web page GUI display 200) within the browser application 108 at the client device 106 over the network 110. Thereafter, the user of the client device 106 may manipulate the GUI elements (e.g., GUI elements 202, 204, 206, 208, 210) of the configuration web page GUI display to input or otherwise modify values for one or more parameters, variables or other settings of the networking device 102 and then transmit or otherwise provide 516 the user-configured values to the configuration web application 116 (e.g., by the user selecting the SAVE button 208), which, in turn, causes the configuration web application 116 to invoke or otherwise trigger one or more APIs or other code 118 associated with the configuration web application 116 to update, save or otherwise modify 518 the device settings data 126 in the configuration database 124 to reflect the user-configured values.

In alternative scenarios, when there is a mismatch between the current representative hash value and the validated reference hash value match, the indication 510 provided by the configuration manager 122 notifies the configuration web application 116 that the local resources 120 are potentially modified or compromised and not in a validated or trusted state. In response, the configuration web application 116 may automatically generate or otherwise provide a web page GUI display within the browser application 108 at the client device 106 that provides a corresponding user notification that the configuration web application 116 cannot be launched because the local resources 120 are potentially untrustworthy and may have been modified, compromised or otherwise corrupted. In this manner, the configuration management process 400 secures the configuration web application 116 from potential vulnerabilities that could result from modification or alteration of the local resources 120 (e.g., by preventing generation of the compromised configuration web page GUI display 300 instead of the validated configuration web page GUI display 200), thereby securing the device settings data 126 at the networking device 102 from undesirable or unintentional modification.

One or more parts of the above implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

Figure 6A:
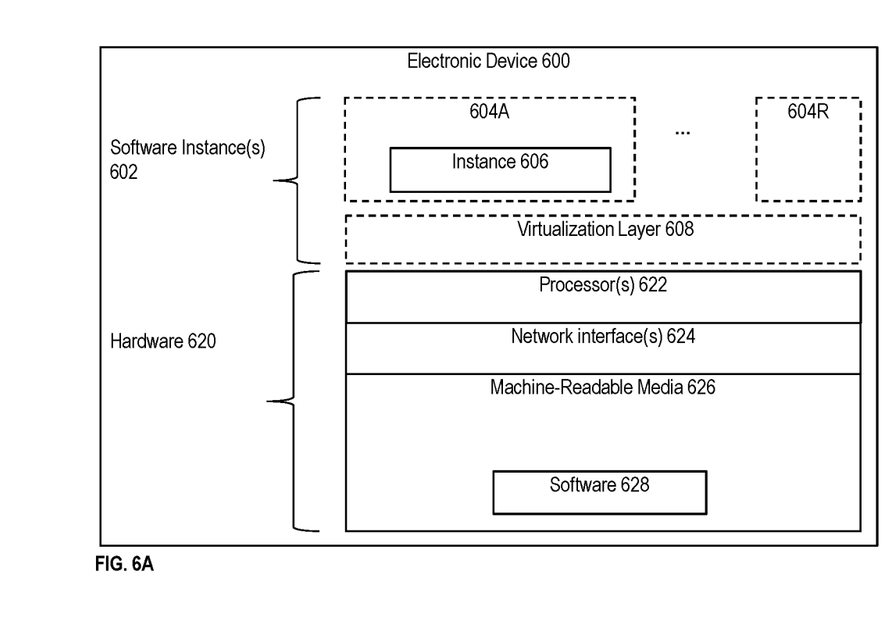
FIG. 6A is a block diagram illustrating an electronic device according to some example implementations.

FIG. 6A is a block diagram illustrating an electronic device 600 according to some example implementations. FIG. 6A includes hardware 620 comprising a set of one or more processor(s) 622, a set of one or more network interfaces 624 (wireless and/or wired), and machine-readable media 626 having stored therein software 628 (which includes instructions executable by the set of one or more processor(s) 622). The machine-readable media 626 may include non-transitory and/or transitory machine-readable media. Each of the previously described clients and the configuration management service may be implemented in one or more electronic devices 600. In one implementation: 1) each of the clients is implemented in a separate one of the electronic devices 600 (e.g., in end user devices where the software 628 represents the software to implement clients to interface directly and/or indirectly with the configuration management service (e.g., software 628 represents a web browser, a native client, a portal, a command-line interface, and/or an application programming interface (API) based upon protocols such as Simple Object Access Protocol (SOAP), Representational State Transfer (REST), etc.)); 2) the configuration management service is implemented in a separate set of one or more of the electronic devices 600 (e.g., a set of one or more server devices where the software 628 represents the software to implement the configuration management service); and 3) in operation, the electronic devices implementing the clients and the configuration management service would be communicatively coupled (e.g., by a network) and would establish between them (or through one or more other layers and/or or other services) connections for submitting requests to the Configuration management service. Other configurations of electronic devices may be used in other implementations (e.g., an implementation in which the client and the configuration management service are implemented on a single one of electronic device 600).

During operation, an instance of the software 628 (illustrated as instance 606 and referred to as a software instance; and in the more specific case of an application, as an application instance) is executed. In electronic devices that use compute virtualization, the set of one or more processor(s) 622 typically execute software to instantiate a virtualization layer 608 and one or more software container(s) 604A-604R (e.g., with operating system-level virtualization, the virtualization layer 608 may represent a container engine (such as Docker Engine by Docker, Inc. or rkt in Container Linux by Red Hat, Inc.) running on top of (or integrated into) an operating system, and it allows for the creation of multiple software containers 604A-604R (representing separate user space instances and also called virtualization engines, virtual private servers, or jails) that may each be used to execute a set of one or more applications; with full virtualization, the virtualization layer 608 represents a hypervisor (sometimes referred to as a virtual machine monitor (VMM)) or a hypervisor executing on top of a host operating system, and the software containers 604A-604R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 628 is executed within the software container 604A on the virtualization layer 608. In electronic devices where compute virtualization is not used, the instance 606 on top of a host operating system is executed on the "bare metal" electronic device 600. The instantiation of the instance 606, as well as the virtualization layer 608 and software containers 604A-604R if implemented, are collectively referred to as software instance(s) 602.

Alternative implementations of an electronic device may have numerous variations from that described above. For example, customized hardware and/or accelerators might also be used in an electronic device.

Figure 6B:
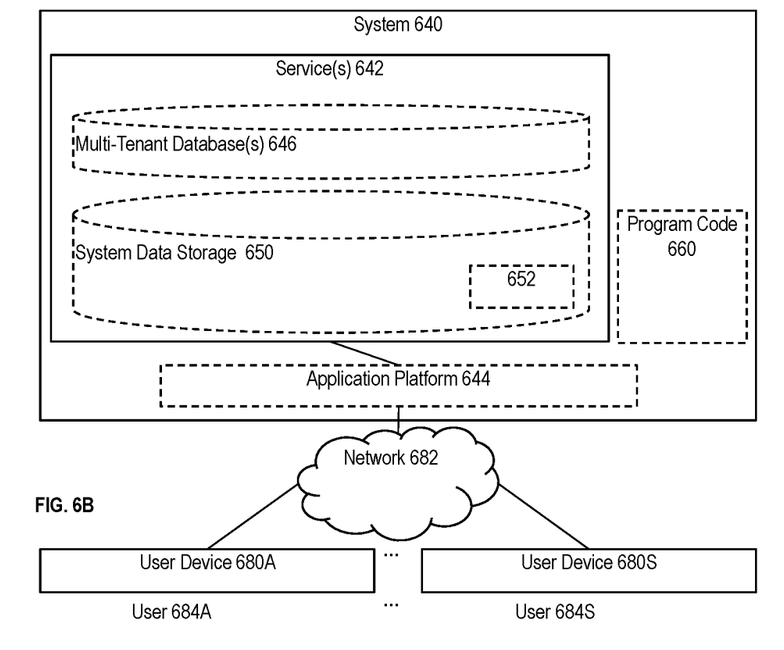
FIG. 6B is a block diagram of a deployment environment according to some example implementations.

FIG. 6B is a block diagram of a deployment environment according to some example implementations. A system 640 includes hardware (e.g., a set of one or more server devices) and software to provide service(s) 642, including the configuration management service. In some implementations the system 640 is in one or more datacenter(s). These datacenter(s) may be: 1) first party datacenter(s), which are datacenter(s) owned and/or operated by the same entity that provides and/or operates some or all of the software that provides the service(s) 642; and/or 2) third-party datacenter(s), which are datacenter(s) owned and/or operated by one or more different entities than the entity that provides the service(s) 642 (e.g., the different entities may host some or all of the software provided and/or operated by the entity that provides the service(s) 642). For example, third-party datacenters may be owned and/or operated by entities providing public cloud services (e.g., Amazon.com, Inc. (Amazon Web Services), Google LLC (Google Cloud Platform), Microsoft Corporation (Azure)).

The system 640 is coupled to user devices 680A-680S over a network 682. The service(s) 642 may be on-demand services that are made available to one or more of the users 684A-684S working for one or more entities other than the entity which owns and/or operates the on-demand services (those users sometimes referred to as outside users) so that those entities need not be concerned with building and/or maintaining a system, but instead may make use of the service(s) 642 when needed (e.g., when needed by the users 684A-684S). The service(s) 642 may communicate with each other and/or with one or more of the user devices 680A-680S via one or more APIs (e.g., a REST API). In some implementations, the user devices 680A-680S are operated by users 684A-684S, and each may be operated as a client device and/or a server device. In some implementations, one or more of the user devices 680A-680S are separate ones of the electronic device 600 or include one or more features of the electronic device 600.

In some implementations, the system 640 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DAAS), one set of tenants may be vendors providing data and another set of tenants may be customers of different ones or all of the vendors' data. As another example, in the context of Platform as a Service (PAAS), one set of tenants may be third-party application developers providing applications/services and another set of tenants may be customers of different ones or all of the third-party application developers.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants. In one implementation, the system 640 is a multi-tenant cloud computing architecture supporting multiple services, such as one or more of the following types of services: Customer relationship management (CRM); Configure, price, quote (CPQ); Business process modeling (BPM); Customer support; Marketing; External data connectivity; Productivity; Database-as-a-Service; Data-as-a-Service (DAAS or DaaS); Platform-as-a-service (PAAS or PaaS); Infrastructure-as-a-Service (IAAS or IaaS) (e.g., virtual machines, servers, and/or storage); Analytics; Community; Internet-of-Things (IoT); Industry-specific; Artificial intelligence (AI); Application marketplace ("app store"); Data modeling; Authorization; Authentication; Security; and Identity and access management (IAM). For example, system 640 may include an application platform 644 that enables PAAS for creating, managing, and executing one or more applications developed by the provider of the application platform 644, users accessing the system 640 via one or more of user devices 680A-680S, or third-party application developers accessing the system 640 via one or more of user devices 680A-680S.

In some implementations, one or more of the service(s) 642 may use one or more multi-tenant databases 646, as well as system data storage 650 for system data 652 accessible to system 640. In certain implementations, the system 640 includes a set of one or more servers that are running on server electronic devices and that are configured to handle requests for any authorized user associated with any tenant (there is no server affinity for a user and/or tenant to a specific server). The user devices 680A-680S communicate with the server(s) of system 640 to request and update tenant-level data and system-level data hosted by system 640, and in response the system 640 (e.g., one or more servers in system 640) automatically may generate one or more Structured Query Language (SQL) statements (e.g., one or more SQL queries) that are designed to access the desired information from the multi-tenant database(s) 646 and/or system data storage 650.

In some implementations, the service(s) 642 are implemented using virtual applications dynamically created at run time responsive to queries from the user devices 680A-680S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 660 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 644 includes an application setup mechanism that supports application developers' creation and management of applications, which may be saved as metadata by save routines. Invocations to such applications, including the configuration management service, may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container (e.g., a virtual machine).

Network 682 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a 6th generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 640 and the user devices 680A-680S.

Each user device 680A-680S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system 640. For example, the user interface device can be used to access data and applications hosted by system 640, and to perform searches on stored data, and otherwise allow one or more of users 684A-684S to interact with various GUI pages that may be presented to the one or more of users 684A-684S. User devices 680A-680S might communicate with system 640 using TCP/IP (Transfer Control Protocol and Internet Protocol) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 680A-680S might include an HTTP client, commonly referred to as a "browser," for sending and receiving HTTP messages to and from server(s) of system 640, thus allowing users 684A-684S of the user devices 680A-680S to access, process and view information, pages and applications available to it from system 640 over network 682.

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

While the flow diagrams in the figures show a particular order of operations performed by certain implementations, such order is exemplary and not limiting (e.g., alternative implementations may perform the operations in a different order, combine certain operations, perform certain operations in parallel, overlap performance of certain operations such that they are partially in parallel, etc.).

While the above description includes several example implementations, the invention is not limited to the implementations described and can be practiced with modification and alteration within the spirit and scope of the appended claims. The description is thus illustrative instead of limiting. Accordingly, details of the exemplary implementations described above should not be read into the claims absent a clear intention to the contrary.

What is claimed is:

1. A method of managing configuration of a networking device, the method comprising:
    obtaining one or more files associated with one or more graphical user interface (GUI) displays associated with a web application for configuring the networking device, wherein the one or more files are maintained in a data storage of the networking device;
    receiving, at the networking device, a request to access the web application; and
    in response to the request:
        determining a representative value indicative of a current state of the one or more files as a function of the current state of the one or more files;
        obtaining a reference value for the one or more files, wherein the reference value reflects a validated state of the one or more files;
        enabling execution of the web application by the networking device using the one or more files to generate one or more GUI elements of the one or more GUI displays associated with the web application when the representative value matches the reference value; and
        when the representative value is different from the reference value, preventing execution of the web application using the one or more files.

2. The method of claim 1, wherein determining the representative value comprises determining a representative hash value by inputting the current state of the one or more files to a cryptographic hash function.

3. The method of claim 2, further comprising:
    determining a validated reference hash value by inputting the validated state of the one or more files to the cryptographic hash function prior to receiving the request; and
    comparing the representative hash value to the validated reference hash value, wherein enabling execution of the web application comprises instantiating the web application using the one or more files when the representative hash value matches the validated reference hash value.

4. The method of claim 1, wherein enabling execution of the web application comprises an instance of the web application generating a configuration web page GUI display using the one or more files when the representative value matches the reference value.

5. The method of claim 4, further comprising initiating code associated with the web application to store, at the networking device, a user-configured value for a setting of the networking device indicated by a first GUI element of the configuration web page GUI display in response to user selection of a second GUI element of the configuration web page GUI display.

6. The method of claim 5, wherein:
the one or more files include a JavaScript file, a cascading style sheet (CSS) file or a static GUI file associated with the web application; and
the code includes an application programming interface (API) configurable to store the user-configured value for the setting of the networking device at the networking device in response to user selection of the second GUI element of the configuration web page GUI display.

7. The method of claim 1, wherein receiving the request to access the web application comprises receiving, at the networking device, the request to access the web application from a client device over a first network, wherein the networking device is configurable to mediate communications between the first network and a second network.

8. The method of claim 7, wherein the networking device comprises one of a router, a switch, a gateway, an access point, a firewall, a proxy server and a load balancer.

9. The method of claim 1, further comprising generating a user notification within a browser application at a client device associated with the request in lieu of instantiating the web application within the browser application at the client device when the representative value is different from the reference value.

10. At least one non-transitory machine-readable storage medium that provides instructions that, when executed by at least one processor, are configurable to cause the at least one processor to perform operations comprising:
obtaining, from a data storage of a networking device, one or more files associated with one or more graphical user interface (GUI) displays associated with a web application for configuring the networking device;
determining a representative value indicative of a current state of the one or more files as a function of the current state of the one or more files in response to the networking device receiving a request to access the web application;
comparing the representative value for the one or more files to a reference value reflecting a validated state of the one or more files; and
enabling execution of the web application using the one or more files to generate one or more GUI elements of the one or more GUI displays associated with the web application when the representative value matches the reference value, wherein execution of the web application using the one or more files is prevented when the representative value is different from the reference value.

11. The at least one non-transitory machine-readable storage medium of claim 10, wherein the instructions are configurable to cause the at least one processor to determine the representative value by inputting the current state of the one or more files to a cryptographic hash function to obtain a representative hash value.

12. The at least one non-transitory machine-readable storage medium of claim 11, wherein the reference value comprises a validated reference hash value determined by inputting the validated state of the one or more files to the cryptographic hash function prior to receiving the request.

13. The at least one non-transitory machine-readable storage medium of claim 10, wherein instantiating the web application comprises an instance of the web application generating a configuration web page GUI display using the one or more files when the representative value matches the reference value.

14. The at least one non-transitory machine-readable storage medium of claim 10, wherein the instructions are configurable to cause the at least one processor to generate a user notification within a browser application at a client device associated with the request in lieu of instantiating the web application within the browser application when the representative value is different from the reference value.

15. The at least one non-transitory machine-readable storage medium of claim 10, wherein the instructions are configurable to cause the at least one processor to prevent the web application from using the one or more files to generate the one or more GUI displays when the representative value is different from the reference value.

16. A networking device comprising:
at least one non-transitory machine-readable storage medium that stores software; and
at least one processor, coupled to the at least one non-transitory machine-readable storage medium, to execute the software that implements a configuration management service and that is configurable to:
obtain one or more local files associated with one or more web page graphical user interface (GUI) displays associated with a configuration web application;
determine a representative value indicative of a current state of the one or more local files as a function of the current state of the one or more local files in response to a request to access the configuration web application;
compare the representative value for the one or more local files to a reference value reflecting a validated state of the one or more local files; and
enabling execution of the configuration web application using the one or more local files when the representative value matches the reference value, wherein execution of the configuration web application using the one or more local files is prevented when the representative value is different from the reference value.

17. The networking device of claim 16, wherein the one or more local files include a JavaScript file, a cascading style sheet (CSS) file or a static GUI file associated with the configuration web application.

18. The networking device of claim 16, wherein the networking device comprises one of a router, a switch, a gateway, an access point, a firewall, a proxy server and a load balancer.

19. The networking device of claim 16, wherein the software is configurable to cause the at least one processor to generate a user notification within a browser application at a client device associated with the request in lieu of instantiating the configuration web application within the browser application when the representative value is different from the reference value.

20. The method of claim 1, wherein the one or more files comprise a JavaScript file, a cascading style sheet (CSS) file or a static GUI file associated with a selectable GUI element of the web application for triggering an application programming interface (API) to modify a configuration of the networking device.

\* \* \* \* \*